Nov. 11, 1924.  
G. D. DICKEY ET AL  
FILTER  
Filed Dec. 23, 1922  
1,514,955  
2 Sheets-Sheet 1

George D. Dickey.  
Harry W. Conrad. Inventors

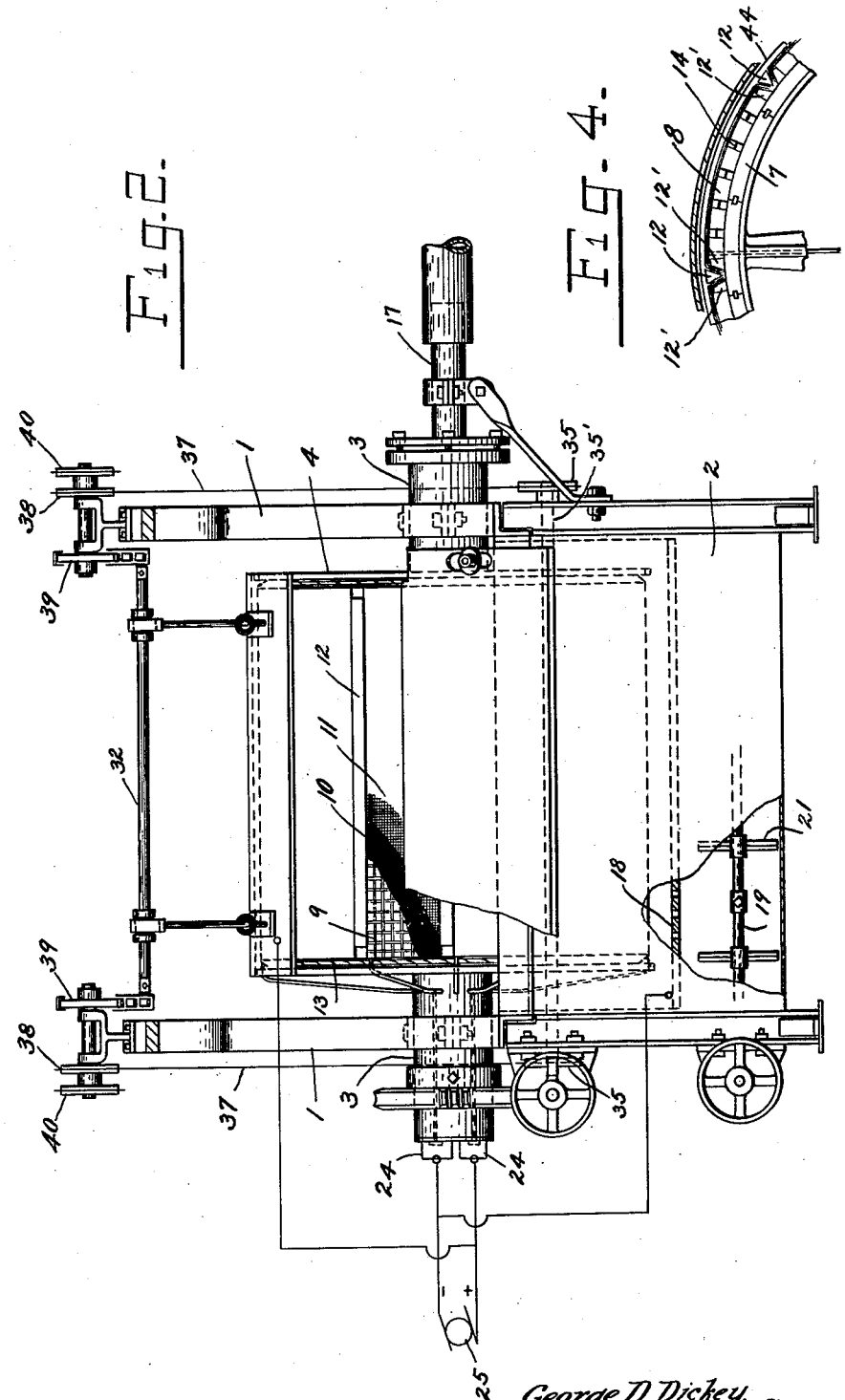

Patented Nov. 11, 1924.

1,514,955

UNITED STATES PATENT OFFICE.

GEORGE D. DICKEY AND HARRY W. CONRAD, OF NEW YORK, N. Y.

FILTER.

Application filed December 23, 1922. Serial No. 608,700.

*To all whom it may concern:*

Be it known that we, GEORGE D. DICKEY, a citizen of the United States, residing in the borough of Manhattan, county of New York, city of New York, State of New York, and HARRY W. CONRAD, a citizen of the United States, residing in the borough of Bronx, county of Bronx, city of New York, State of New York, have invented certain new and useful Improvements in Filters, of which the following is a full, clear, and exact description.

Our invention relates to filters and has for its object to utilize in such filters the phenomenon of electro-osmosis for increasing the deposit of solid matters held in suspension in the slurry being treated. It further has for its object to utilize the principle of electro-osmosis in reducing the moisture content of the solids delivered by the filter. It further has for its object to provide a rotary vacuum filter in which our invention is embodied.

A rotary vacuum filter is desirable because its action is continuous and automatic, the solids being picked up during every revolution of the drum as it passes through the container of slurry in which it is suspended and being continuously removed from the exposed portion of the drum by a scraper or other suitable means, the clarified liquor being drawn off through the filter medium on the surface of the filter drum and the slurry container being continuously supplied with the material to be filtered. With many materials, however, the action of such a filter is so slow that during the revolution of the drum the layer, or cake of solids is not sufficiently thick to make the operation economical or to produce a clean discharge of the solids from the filter medium. In order to accomplish this, the layer or cake built up on the surface of the filtering medium should be at least approximately three-sixteenths of an inch in thickness.

By means of our invention satisfactory results can be obtained from the slurries having clay or other substances in suspension so that such slurries can be handled much more rapidly and economically than heretofore, and, furthermore, the separated solids can be rapidly freed from a large proportion of their moisture content, both of these results being due to the peculiar action of what is known as electro-osmosis. The depositing phenomenon is due to the action of electrodes immersed in a suitable slurry and forming terminals of a circuit carrying a continuous current, it being a known fact that when a pair of such electrodes is immersed in a clay slurry or the like the solid portions will gather around the positive electrode and to a large extent adhere thereto, forming a layer or cake thereon, and that, conversely, the liquid tends to move toward the negative electrode. When this action takes place within the slurry, the solids of the slurry are separated out and deposited upon the positive electrode. When this action takes place outside of the slurry, the moisture content is separated from the solids, leaving them in a comparatively dry condition. In this moisture reducing operation also, the current passing from one electrode to the other through the solid cake acts to generate heat within the cake and assist in that way in reducing the moisture content.

The following is a description of an embodiment of our invention, reference being had to the accompanying drawings, in which, Figure 1 shows an end elevation with parts broken away of a rotary filter embodying our invention;

Fig. 2 is a side elevation of the same, parts being shown in section on the line 2—2, Fig. 1, and parts being broken away for clearness;

Fig. 4 is a slightly enlarged sectional detail on the line 4—4, Fig. 3.

Figure 1:
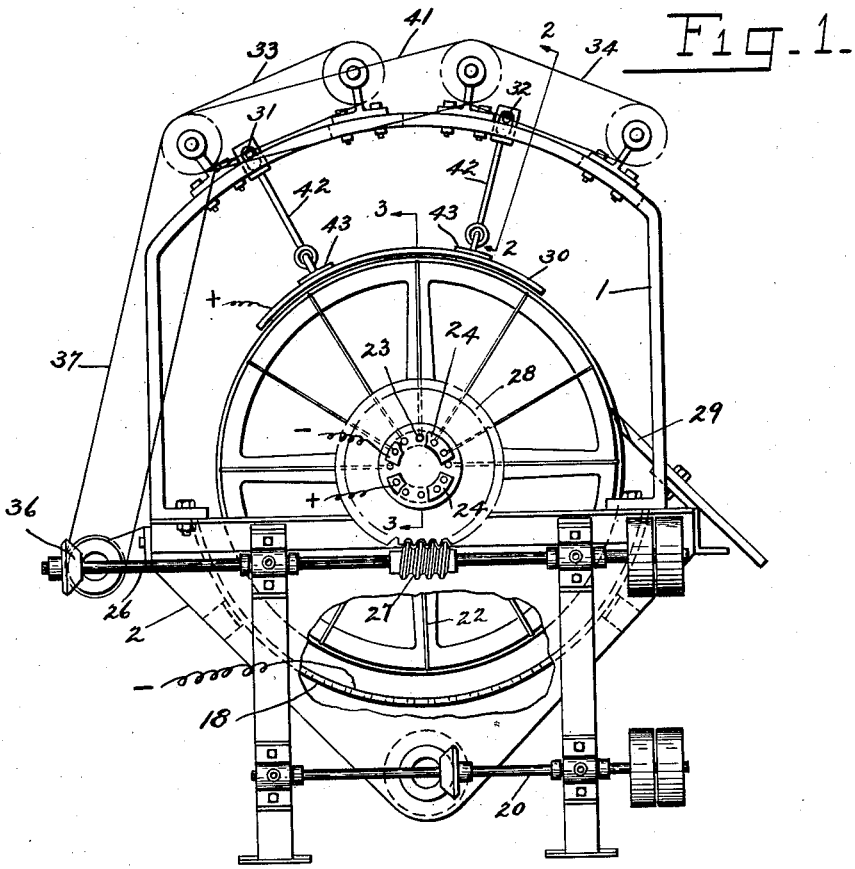
Figure 3:
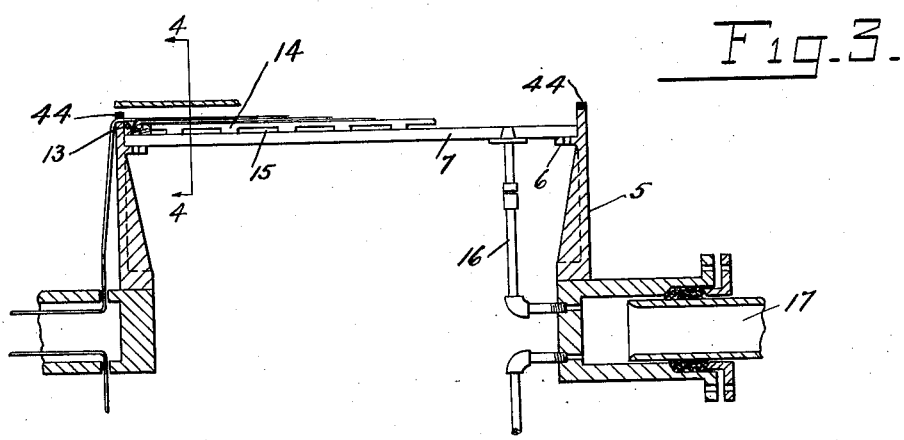
Fig. 3 is a partial section of a portion of the filter drum on the line 3—3, Fig. 1.

Referring more particularly to the drawings, 1—1 are frames supporting a container 2 which container is for the slurry and has bearings in which the trunnions 3 of a rotary filter drum 4 are mounted. This rotary filter drum is provided with spiders 5 carrying flanges 6 which support a cylindrical flooring 7 preferably of wood or other insulating material on which are built up compartments 8 covered by sections of a porous filtering medium. Each section is made up of a relatively coarse inner screen 9 which is covered by canvas 10 which is covered by a metallic screen 11 preferably of low resistance. The metallic portions of the several sections are electrically separated one from the other and have their sides held in position by separating clamping bars 12 cooperating with strips 12′ and their ends secured by non-conducting ropes or bands 13. The filtering medium sections are spaced away from the flooring 7 by strips or blocks 14 which preferably have openings 15 to permit the free circulation of liquid. The spaces between the flooring 7 and the filter medium sections are connected by pipes 16 with a suction exhaust 17 which acts to produce a partial vacuum on the inner side of the filter medium.

The construction thus far described is similar to that used in ordinary rotary vacuum filters, with the exception that in such filters the outer fine wire screen is not employed and the filtering medium is not divided into sections or insulated.

In order to provide for securing the effect of electro-osmosis we electrically charge the metallic portions of the filtering medium sections which are within the container so as to cause them to be of positive polarity and place within the container in proximity to the outer surface of the drum a stationary electrode 18 which is electrically charged so as to be of negative polarity. The electrode 18 may be spaced away from the drum by one and a half inches or less according to the nature of the product treated. When the contents of the slurry are agitated this electrode should be provided with apertures or perforations and as shown consists of a perforated metallic plate preferably of low resistance. Beneath the electrode 18 is an agitator 19 driven from the shaft 20 and having paddles 21 for stirring up the slurry. In order to keep the metallic portions of the filtering medium sections properly charged we connect to the metallic portions of each section a corresponding insulated conductor 22 which is connected to a commutator contact 23. 24 are commutator brushes supported by a suitable holder (not shown). The lower brush is connected to the positive pole of the direct current generator 25 and bears upon the commutator contacts to which the conductors 22, leading to the submerged filter medium sections, are connected. As diagrammatically shown, the electrode 18 is connected to the negative pole of the generator 25 so that it constitutes a negative pole.

The filter drum is driven by the shaft 26 carrying the worm 27 which meshes with a gear 28 connected to one of the trunnions 3. When the container is filled with a suitable slurry and the drum is revolved by the action of the worm 27, the submerged filter sections constitute positive poles and the submerged electrode 18 constitutes the opposed negative pole, with the result that the solid matters in the slurry are repelled by the electrode 18 and deposited in a layer upon the positive submerged filter medium sections. As the drum is further revolved this deposit is carried out of the slurry in the container and finally around to a scraper 29 which acts to remove it from the surface of the drum. During this operation a portion of the liquid of the slurry is drawn by vacuum through the filter medium sections into the space between them and the flooring 7 and drawn out through the suction pipes 16 and 17. This suction action also aids in depositing a layer on the filter medium and in drying this layer when withdrawn from the slurry.

In order to reduce the moisture content of the cake as it leaves the slurry, we provide a movable insulated electrode 30 which is carried by rods 31—32 which are in turn carried by sprocket chains 33—34 running on suitable wheels carried by the frame members 1. These sprocket chains are driven by wheels 35 carried by the shaft 35' parallel to the axis of the drum and driven by a bevel gear 36 upon the shaft 26 and sprocket chains 37 engaging the wheels 38, which are rigidly connected to the wheels 39 carrying the chains 33 and also the wheels 40 which act through sprocket chains 41 to drive wheels carrying the sprocket chains 34. The plate 30 is connected to the rods 31 and 32 by links 42, there being considerable lost motion between the rods and the plate 30 so as to permit the plate 30 to rest evenly upon the surface of the layer or cake on the drum 4. The rods 42 are insulated from the plate 30 by insulation 43 so that the plate 30 can be electrically charged by connecting it to the positive pole of the generator 25. The metallic portions of the sections of the filtering medium which are beneath the plate 30 are connected to the negative pole of the generator 25, this being accomplished through the conductors 22 heretofore referred to and the upper commutator brush 24 connected to said negative pole and bearing on corresponding commutator contacts.

The electrode 30 extends laterally over the edges of the spider which are provided with faces of insulation 44 which support the plate 30 so that it cannot contact with the screen 11 if no cake or layer is present and thus form a short circuit.

As the filter drum is driven by the worm 27 the sprocket chains 34 are caused to move so as to permit the plate 30 after it has first engaged the layer on the filter drum to move with the filter drum and remain in contact with the cake, or layer, of solid material thereon for a considerable period. After the rods 31 and 32 have reached the end of the lower run of the sprocket chains 33 and 34, they act to lift the plate 30 so as to remove it from the surface of the layer on the drum and then carry it back and bring it again in contact with the layer on the drum at another point. The length of the plate 30 and its travel are such that substantially all portions of the cake, or layer, formed upon the drum are one after another engaged by the plate 30. This plate being of positive polarity and the filter medium sections, when beneath it, being of negative polarity as above described, electro-osmosis takes place between those two poles, with the result that the moisture content in the cake is drawn toward the negative pole, leaving the cake with a lesser moisture content than it would have if this action did not take place, and, further, some current passing between the electrode plate 30 and the filtering medium sections through the layer as a resistance, acts to heat up said layer to some extent. The suction also draws away the moisture attracted toward the negative portions of the drum sections.

In operating the filter the drum is preferably driven so that any given portion will be submerged for from one half to five minutes. A voltage of sixty volts is suitable for charging the electrodes. The voltage used depends on the spacing of the electrodes and the nature of the material.

From the foregoing it will be seen that the deposit of a solid matter upon the filter drum is expedited by means of electro-osmosis and that after the deposit has been formed its moisture content is reduced by a similar action.

The dividing of the metallic portions of the filtering medium into insulated sections is necessary only where the external electro-osmosis is to be used for removing the moisture content or it is desired to have the exposed portions of the drum of a different polarity from the submerged portions. We preferably divide the sections as described and use both external and internal electro-osmosis, so as to get the full benefit of our invention.

As will be evident to those skilled in the art our invention permits of various modifications without departing from the spirit thereof or the scope of the appended claims.

What we claim is:

1. A revolving drum carrying a conducting electrode adjacent to its periphery, a container into which the lower portion of said drum extends, a fixed electrode within said container opposed to said lower portion of said drum, and means for negatively charging said fixed electrode and positively charging the portion of the drum electrode opposed thereto, means for maintaining within said drum a partial vacuum co-operating with said electrodes in producing a depositing action, means for rotating said drum, and means for removing the deposit therefrom.

2. A revolving drum carrying a porous conducting electrode adjacent to its periphery, a container for slurry into which the lower portion of said drum extends, a fixed electrode within said container opposed to said lower portion of said drum, means for negatively charging said fixed electrode and positively charging a portion of the drum electrode opposed thereto, means for rotating said drum, means for removing the deposit therefrom, and means for subjecting the deposit while on said drum to the action of electro-osmosis at a point outside of said container so as to draw the moisture content of said deposit inward.

3. A revolving drum carrying a porous electrode adjacent to its periphery, a container into which the lower portion of said drum extends, an electrode fixed within said container opposed to said lower portion of said drum, and means for negatively charging said fixed electrode and for positively charging the portion of the drum opposed thereto, means for rotating said drum, and means for removing the deposit therefrom, and means for withdrawing from the unsubmerged filter medium and the interior of said drum liquid passing through said porous periphery, said withdrawing means maintaining a partial vacuum within said drum and assisting in causing a deposit on said drum.

4. A revolving drum carrying a porous electrode adjacent to its periphery, a container into which the lower portion of said drum extends, an electrode fixed within said container opposed to said lower portion of said drum, means for negatively charging said fixed electrode and positively charging the portion of the drum opposed thereto, means for rotating said drum, means for removing the deposit therefrom, and means for subjecting the deposit while on said drum to the action of electro-osmosis at a point outside of said container so as to draw the moisture content of said deposit inward, and suction means acting upon the inwardly drawn moisture content of said deposit.

5. In a filter, the combination of a revolving drum carrying a porous electrode adjacent to its periphery, said electrode being divided circumferentially into insulated sections, a container into which the lower portion of said drum extends, an electrode fixed within said container opposed to said lower portion of said drum, means for negatively charging said fixed electrode and unsubmerged sections of said porous electrode and for positively charging submerged sections of said porous electrode opposed to said fixed electrode, said means comprising a current changer for periodically reversing the polarity of said porous sections, and means co-operating with said negatively charged porous sections for subjecting the deposit thereon to the action of electro-osmosis so as to draw the moisture content of said deposit inward.

GEORGE D. DICKEY.
HARRY W. CONRAD.